(12) United States Patent
Haitjema et al.

(10) Patent No.: US 9,568,304 B2
(45) Date of Patent: Feb. 14, 2017

(54) IMAGE SEQUENCE AND EVALUATION METHOD AND SYSTEM FOR STRUCTURED ILLUMINATION MICROSCOPY

(71) Applicant: MITUTOYO CORPORATION, Kanagawa (JP)

(72) Inventors: Han Haitjema, Eindhoven (NL); Frans de Nooij, Eindhoven (NL); Lukasz Redlarski, Eindhoven (NL)

(73) Assignee: MITUTOYO CORPORATION, Kanagawa (JP)

( * ) Notice: Subject to any disclaimer, the term of this patent is extended or adjusted under 35 U.S.C. 154(b) by 159 days.

(21) Appl. No.: 14/612,370

(22) Filed: Feb. 3, 2015

(65) Prior Publication Data

US 2015/0219441 A1    Aug. 6, 2015

(30) Foreign Application Priority Data

Feb. 6, 2014  (EP) .................................... 14154205

(51) Int. Cl.
*G01B 11/14* (2006.01)
*G01B 11/06* (2006.01)
(Continued)

(52) U.S. Cl.
CPC ....... *G01B 11/0608* (2013.01); *G01B 11/2513* (2013.01); *G01B 11/2527* (2013.01); *G02B 21/364* (2013.01)

(58) Field of Classification Search
CPC ............. G01B 11/0608; G01B 11/2513; G01B 11/2518; G01B 11/2527; G02B 21/364
(Continued)

(56) References Cited

U.S. PATENT DOCUMENTS 6,028,670 A * 2/2000 Deck .................. G01B 11/2441
                                                    356/497
8,576,410 B2 * 11/2013 Jansen ............... G01B 11/0608
                                                    356/609
(Continued)

FOREIGN PATENT DOCUMENTS

EP           2327956        6/2011

OTHER PUBLICATIONS

Noguchi et al., "Microscopic Shape From Focus Using Active Illumination", Oct. 1994.
(Continued)

*Primary Examiner* — Hoa Pham
(74) *Attorney, Agent, or Firm* — Greenblum & Bernstein, P.L.C.

(57) ABSTRACT

In a method and apparatus for determining the height of a plurality of spatial positions on a surface of a specimen, a light beam is projected on the surface. The surface is scanned along an optical axis in different scanning positions. The light reflected by the surface is detected in scanning positions with a spatial pattern having corresponding spatial pattern positions. From the detected light for each spatial position of the surface, an envelope curve of intensity values corresponding to scanning positions is determined. A maximum of the envelope curve and its corresponding scanning position being representative of the height of the spatial position of the surface is selected. The spatial pattern is moved in a sequence of 2n steps (n>2) in a first and a second spatial direction over a distance of ¼ and 1/n pattern wavelength, respectively.

12 Claims, 7 Drawing Sheets

(51) Int. Cl.
*G02B 21/36* (2006.01)
*G01B 11/25* (2006.01)

(58) Field of Classification Search
USPC .................................. 356/601–623; 382/154
See application file for complete search history.

(56) References Cited

U.S. PATENT DOCUMENTS

| | | | |
|---|---|---|---|
| 8,649,024 B2 * | 2/2014 | Colonna de Lega | ........... A61F 9/00836 356/601 |
| 2010/0135547 A1 | 6/2010 | Lee et al. | |
| 2010/0321773 A1 | 12/2010 | Chen et al. | |
| 2012/0140243 A1 | 6/2012 | De Lega | |
| 2015/0097942 A1 * | 4/2015 | Benedetti | ........... G02B 21/0032 348/80 |
| 2016/0017194 A1 * | 1/2016 | Tanaka | ........... B32B 27/00 528/302 |

OTHER PUBLICATIONS

Kieran G. Larkin, "Efficient nonlinear algorithm for envelope detection in white light interferometry", J. Opt. Soc. Am A, Apr. 1996, pp. V13, No. 4, Apr. 1996.

Partick Sandoz, "An algorithm for Profilometry by white-light phase-shifting interferometry", J. Mod. Opt. 43, 1996, pp. 1545-1554.

Search report from European Patent Office (EPO), mail date is Jun. 17, 2014.

* cited by examiner

IMAGE SEQUENCE AND EVALUATION METHOD AND SYSTEM FOR STRUCTURED ILLUMINATION MICROSCOPY

CROSS-REFERENCE TO RELATED APPLICATIONS

The present application claims priority under 35 U.S.C. §119 of European Application No. 14154205.0, filed on Feb. 6, 2014, the disclosure of which is expressly incorporated by reference herein in its entirety.

BACKGROUND OF THE INVENTION

1. Field of the Invention

The invention relates to the field of microscope systems, and more specifically to a method and system for structured illumination microscopy. In particular, the invention relates to an improved method and system for providing a 3D height map of a specimen.

2. Description of Related Art

EP 2 327 956 A1 discloses an optical sensor which is used to determine the range (distance) of individual features of a three-dimensional structure. The sensor has a spatially modulating periodic patterned light source which illuminates the specimen. An array of detector elements is used to detect images of the projected pattern. While the specimen is moved through the focal position, the pattern is varied for at least three spatial modulation phases when moving the spatial periodic light pattern in a direction perpendicular to the optical axis of the optical sensor, parallel to the direction in which the periodic pattern is periodic. Analyzing the output signal of the detector includes for each spatial position of the detector the determination of the amplitude of the signal detected during the scanning and determining the scanning location where the amplitude has a maximum.

US 2010/0135547 A1 discloses systems and methods for optical sectioning microscopy with structured illumination. A light source generates a light beam with a spatial pattern for successively illuminating a sample at each phase of a plurality of phases. A sinusoidal pattern in multiple directions is used. The pattern is moved in both the x- and y-direction at a single Z-location, and the patent gives an evaluation method for obtaining an axially sectioned image.

US 2012/0140243 relates to methods for forming a three-dimensional image of a test object. The methods include directing light to a surface of best-focus of an imaging optic, where the light has an intensity modulation in at least one direction in the surface of best-focus. The test object is scanned relative to the imaging optic so that a surface of the measurement object passes through the surface of best-focus of the imaging optic as the test object is scanned. For each of a series of positions of the test object during the scan, a single image of the measurement object is acquired using the imaging optic. The intensity modulation of the light in the surface of best-focus is different for successive images. A three-dimensional image of the test object is formed based on the acquired images. The sequence and evaluation of the images are not disclosed.

In the prior art, no solution is provided for the creation of a 3D height map of a specimen with good Z resolution, and highly independent of the surface structure, where neighboring points may have a different height and reflectivity, and local slopes may be present.

SUMMARY OF THE INVENTION

It would be desirable to provide a method and apparatus for creating an improved 3D height map of a specimen. It would also be desirable to provide a method and apparatus for creating a 3D height map of a specimen with good Z resolution. It would further be desirable to provide a method and apparatus for creating a 3D height map of a specimen largely independent of the surface structure.

To better address one or more of these concerns, in a first aspect of the invention a method for determining the height of a plurality of spatial positions on a surface of a specimen is provided. The method comprises:

projecting a light beam on the surface, the light beam having a spatial pattern which is periodic in at least two directions perpendicular to an optical axis of the light beam;

moving the spatial pattern to different spatial pattern positions;

scanning the surface along the optical axis in different scanning positions, wherein there is a fixed relationship between a moving distance between subsequent spatial pattern positions, and a scanning distance between subsequent scanning positions;

detecting the light reflected by the surface in scanning positions with the spatial pattern having corresponding spatial pattern positions;

determining, from the detected light for each spatial position of the surface, an envelope curve of intensity values corresponding to scanning positions; and selecting a maximum of the envelope curve and its corresponding scanning position being representative of the height of the spatial position of the surface, wherein the spatial pattern is a sinusoidal pattern having a pattern wavelength in the at least two directions, the spatial pattern being moved in a sequence of 2n steps (n>2), the spatial pattern being moved by n times repeating the following steps (a)-(c) involving a starting spatial pattern position, and a next spatial pattern position:

(a) moving the spatial pattern relative to the starting spatial pattern position in a first spatial direction over a first moving distance of ¼ pattern wavelength;

(b) moving the spatial pattern relative to the starting spatial pattern position in a second spatial direction over a second moving distance of 1/n pattern wavelength to the next spatial pattern position; and (c) making this next spatial pattern position the starting spatial pattern position.

In the sinusoidal spatial pattern, a light intensity may be rounded and digitized in at least two levels. The pattern may comprise digitized pixels, wherein in each pattern wavelength at least two pixels are contained.

The method allows the creation of a 3D height map of a specimen with good Z resolution, and independent of the surface structure. The contrast envelope curve is less sensitive to neighboring points with a different height and reflectivity, to local slopes, and also appears to be less sensitive to aberrations of the used microscope objective in the projection of the patterned light beam on the specimen and/or in the detection of the light reflected by the specimen.

It is noted that the order of the steps (a) and (b) may be reversed. It is further noted that the first spatial direction is different from the second spatial direction. In particular, the first spatial direction is at an angle (different from zero degrees) to the second spatial direction.

In an embodiment of the method, the pattern wavelength in each of the at least two directions is equal. With such equal pattern wavelength, the sensitivity to directional structures on the specimen is limited.

In an embodiment of the method, the spatial pattern includes two orthogonal sinusoidal patterns, and wherein for k scanning positions the intensity I(x,y) of a point (x,y) of the spatial pattern is defined as:

$$I(x, y) = 0.5 + 0.25 \cdot \sin\left(\frac{(x + i \cdot \lambda/n + y + j \cdot \lambda/4) \cdot 2\pi}{\lambda}\right) + 0.25 \cdot \sin\left(\frac{(x + i \cdot \lambda/n - y - j \cdot \lambda/4) \cdot 2\pi}{\lambda}\right)$$

wherein:
i=1, 1, 2, 2, . . . , n, n
j=0, 1, 0, 1, . . .
k=2i+j−1.

In another embodiment of the method, the spatial pattern includes three sinusoidal patterns oriented at 120° to each other, and wherein for k scanning positions the intensity I(x,y) of a point (x,y) of the spatial pattern is defined as:

$$I(x, y) = 0.5 + \frac{1}{6}\left[\begin{array}{l} \sin\left(\frac{2\pi \cdot (y - j \cdot \lambda/2)}{\lambda}\right) + \\ \sin\left(\frac{2\pi \cdot (y - j \cdot \lambda/2 + \sqrt{3}\,x)}{2\lambda} - \frac{\pi}{4} - (i-1) \cdot \frac{2\pi}{n}\right) + \\ \sin\left(\frac{2\pi \cdot (y - j \cdot \lambda/2 - \sqrt{3}\,x)}{2\lambda} + \frac{\pi}{4} + (i-0) \cdot \frac{2\pi}{n}\right) \end{array}\right]$$

wherein:
i=1, 1, 2, 2, . . . , n, n
j=0, 1, 0, 1, . . .
k=2i+j−1.

In an embodiment of the method, a time period of moving between two subsequent spatial pattern positions and two subsequent scanning positions is equal. Accordingly, whenever a spatial pattern position is reached, at the same time a scanning position may be reached, resulting in an intensity value of light detected by the light detector for each spatial position of the surface to be acquired for a corresponding scanning position, resulting in a minimum of acquisition time.

In an embodiment of the method, the scanning movement is a continuous movement, in particular an even movement. During the continuous, preferably even scanning movement, moving from one scanning position to a further scanning position, the phase of the spatial pattern is changed alternatingly in the first and the second spatial direction, such that at every scanning position a predetermined phase of the spatial pattern is set, and light reflected by the surface of the specimen is detected. The continuous, preferably even scanning movement provides for a short data acquisition time.

In an embodiment of the method, the step of selecting a maximum of the envelope curve comprises calculating a center of gravity of the envelope.

In an embodiment of the method, the light beam is a strobing light beam of which the light pulses are synchronized with the phase of the moving spatial pattern.

In an embodiment of the method providing enhanced sensitivity, each intensity value as determined from the detected light for each spatial position of the surface is multiplied by a weighing factor based on the light intensity of the corresponding spatial position on the spatial pattern, emitted when the light intensity is detected.

In an embodiment of the method, a local contrast is calculated based on a difference of intensity values at spatial positions separated by half the wavelength, or by half the wavelength plus a multiple of wavelengths. From these local contrast values for each spatial position and scanning position an envelope curve is determined with a method identical to the method to determine an envelope curve from the intensity values.

In a second aspect of the present invention, an apparatus for determining the height of a plurality of spatial positions on a surface of a specimen, in particular for performing the method according to the invention, is provided. The apparatus comprises:

a light beam projector configured to project a light beam on the surface, the light beam having a spatial pattern which is periodic in at least two directions perpendicular to an optical axis of the light beam, and which moves to different spatial pattern positions;

a scanner configured for scanning the surface along the optical axis in different scanning positions, wherein there is a fixed relationship between a moving distance between subsequent spatial pattern positions, and a scanning distance between subsequent scanning positions;

a light detector configured for detecting the light reflected by the surface in scanning positions with the spatial pattern having corresponding spatial pattern positions; and a processing unit configured for determining, from the light detected by the light detector for each spatial position of the surface, an envelope curve of intensity values corresponding to scanning positions, selecting a maximum of the envelope curve and its corresponding scanning position, and calculating the height of the spatial position of the surface, wherein the spatial pattern is a sinusoidal pattern having a pattern wavelength in the at least two directions, the spatial pattern being moved in a sequence of 2n steps (n>2), the spatial pattern being moved by n times repeating the following steps (a)-(c) involving a starting spatial pattern position, and a next spatial pattern position:

(a) moving the spatial pattern relative to the starting spatial pattern position in a first spatial direction over a first moving distance of ¼ pattern wavelength;

(b) moving the spatial pattern relative to the starting spatial pattern position in a second spatial direction over a second moving distance of 1/n pattern wavelength to the next spatial pattern position; and (c) making this next spatial pattern position the starting spatial pattern position.

In a third aspect of the present invention, a computer program is provided, comprising computer instructions which, when loaded in a processor, cause the processor to control the apparatus of the present invention to perform the method of the present invention.

These and other aspects of the invention will be more readily appreciated as the same becomes better understood by reference to the following detailed description and considered in connection with the accompanying drawings in which like reference symbols designate like parts.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1:
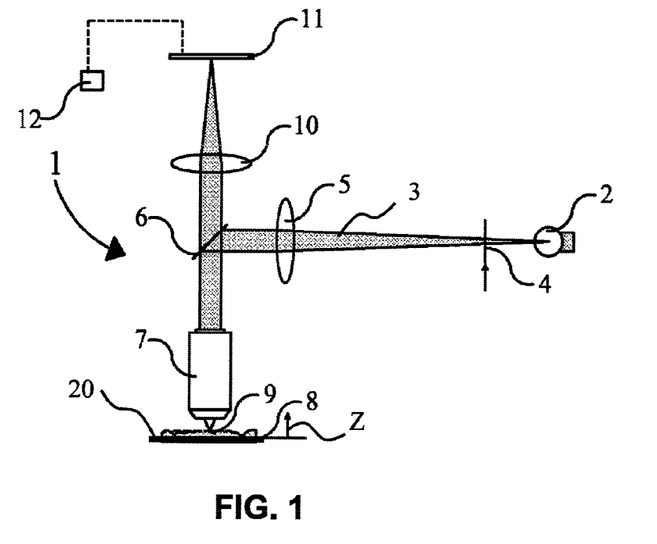
FIG. 1 schematically depicts an embodiment of an apparatus according to the present invention.

FIG. 1 depicts an apparatus 1 for forming a three-dimensional, 3D, height map of a specimen 8. The apparatus 1 comprises a light source 2, constructed and arranged to generate a light beam 3. In the path of the light beam 3, a spatial light modulator 4, a lens 5, and a beam splitter 6 are arranged. The apparatus 1 further comprises an objective 7, adapted to receive and conduct the light beam 3, and a support 20 for carrying a specimen 8 of which the height map of its upper surface 9 is to be determined. The apparatus 1 is further provided with a second lens 10, and a two dimensional light detector 11 (such as a camera) comprising an array of light detector elements, each adapted to convert an intensity of incident light of the light beam 3 received into a signal. The signals are sent to a processing unit (or processor) 12, which is preferably formed by a computer or computer system programmed to perform control of the apparatus 1 and processing of the signal data to provide the height map. The objective 7 may be adapted to scan the specimen 8 in a + or −Z direction, as indicated in FIG. 1. Additionally or alternatively, the specimen 8 may be scanned by moving it in the + or −Z direction. The latter movement may be performed by moving the support 20. Additionally or alternatively, a microscope assembly including light source 2, spatial light modulator 4, beam splitter 6, objective 7, second lens 10, and light detector 11 can be moved as a whole relative to specimen 8 and its support 20 to obtain a scanning function involving different scanning positions.

The spatial light modulator 4 may comprise fixed gratings that are movable in single, mutually different directions perpendicular to an optical axis of light beam 3 to produce a light beam 3 having a moving spatial pattern. Alternatively, available microdisplay technology may be used, such as implemented in a Digital Micromirror Device, DMD, reflective or transmissive Liquid Crystal Device, LCD, Liquid Crystal on Silicon, LCoS, device, Light Emitting Device, LED, having a strip array, scanning mirror device, laser scanning projector, etc.

To obtain the desired periodic spatial patterns, in some embodiments different one-directional sine patterns are projected in succession and combined by either hard- or software to give effectively the same multi-dimensional patterns for which the evaluation is specified here.

The light beam 3 generated by the light source 2 is subjected to the spatial light modulator 4, travels through the lens 5 and to the beam splitter 6, which directs the light beam 3 to the objective 7, which in turn directs the light beam 3 to the surface 9 of the specimen 8. The light beam 3 reflected by the specimen 8 travels through the objective 7, the beam splitter 6 and the second lens 10 and hits the light detector 11.

Figure 2:
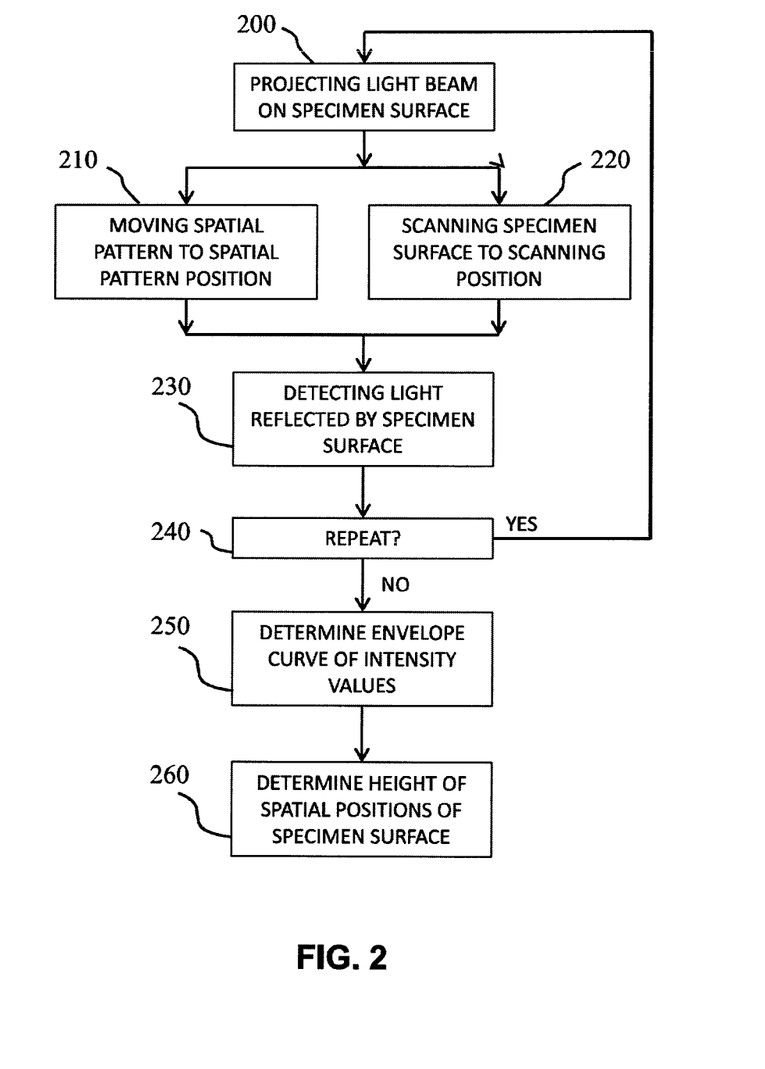
FIG. 2 depicts a flow diagram of a method according to the present invention.

FIG. 2 depicts a flow diagram illustrating a method for determining a 3D height map of a specimen.

In step 200, a light beam is projected on the surface of the specimen. The light beam 3 has a spatial pattern which is periodic in at least two directions perpendicular to an optical axis of the light beam 3.

In step 210, the spatial pattern is moved from one spatial pattern position to a different spatial pattern position, as specified below.

In step 220, the surface of the specimen 8 is scanned along the optical axis from one scanning position to a next scanning position. Step 220 may be performed substantially consecutively, overlapping, or simultaneously with step 210. There is a fixed relationship between a moving distance between subsequent spatial pattern positions, and a scanning distance between subsequent scanning positions.

In step 230, the light reflected by the surface of the specimen in a scanning position having a corresponding spatial pattern position is detected. This detection results in light intensity data for positions on the surface 9 of the specimen 8, modulated by the spatial pattern of the light beam 3. The intensity data are stored for evaluation.

In step 240, it is determined whether to repeat the steps 200-230 for different spatial pattern positions and corresponding scanning positions, or not. If yes, as denoted by 'YES', the flow continues at step 200. If no, as denoted by 'NO', the flow continues at step 250. A decision to repeat is taken based on the total (expected) height range of the specimen 8, taking into account the scanning distance between subsequent scanning positions.

In step 250, having collected the intensity data for all scanning positions, an envelope curve of intensity values corresponding to scanning positions is determined from the detected light for each spatial position of the surface 9.

In step 260, a maximum of the envelope curve, and its corresponding scanning position being representative of the height of the spatial position of the surface 9 are determined.

The spatial light modulator 4 is configured to generate a spatial pattern that is periodic in multiple directions, or to compose such a pattern out of several unidirectional patterns. The spatial pattern is a sinusoidal pattern has a pattern wavelength in the at least two directions (see step 200).

Further to step 210, the spatial pattern is moved in a sequence of 2n steps (n>2). The spatial pattern is moved by n times repeating the following steps (a)-(c) involving a starting spatial pattern position, and a next spatial pattern position:

(a) moving the spatial pattern relative to the starting spatial pattern position in a first spatial direction over a first moving distance of ¼ pattern wavelength;

(b) moving the spatial pattern relative to the starting spatial pattern position in a second spatial direction over a second moving distance of 1/n pattern wavelength to the next spatial pattern position; and (c) making this next spatial pattern position the starting spatial pattern position.

When such spatial patterns would be moved in a single direction, lines of minimal contrast appear, caused by a constant phase of the spatial pattern when moving the spatial pattern in the first spatial direction. To counter this disadvantage, the spatial pattern is moved a quarter of its wavelength ($\lambda$/4) in a first spatial direction after each step in the single direction (the second spatial direction). Alternatively, the spatial pattern can be moved a quarter of its wavelength in a first spatial direction before each step in the single direction. This makes the spatial pattern repeat after 2n steps in total. During this moving of the spatial pattern, the specimen 8 on which the spatial pattern is projected, moves in the Z-direction, preferably monotonously. An image is taken by image detector 11 at each step of the spatial pattern, in conjunction with recording the corresponding Z position of the specimen 8.

In the following, the X,Y location at the spatial light modulator 4 is denoted by (x,y), the corresponding projected location at the specimen 8 is denoted by (x',y') and the coordinates of the corresponding projected image at the image detector is denoted by (x'',y'').

As a first example, the spatial pattern may comprise two orthogonal sinusoidal patterns that can be described as a sinusoidal checkerboard. As a second example, the spatial pattern may comprise three sine patterns that are projected at 120° relative to each other.

In such sinusoidal patterns, a light intensity may be rounded and digitized in at least two levels.

According to the first example, wherein the spatial pattern comprises two orthogonal sinusoidal patterns that can be described as a sinusoidal checkerboard, the intensity I(x,y) of a periodic pattern on an X,Y orthogonal coordinate system, e.g. representing the location of pixels of a digital illumination device, such as a combination of the light source 2 and the spatial light modulator 4, can be written as expressed in equation (1) below:

$$I(x, y) = 0.5 + 0.25 \cdot \sin\left(\frac{(x+y) \cdot 2\pi}{\lambda}\right) + 0.25 \cdot \sin\left(\frac{(x-y) \cdot 2\pi}{\lambda}\right) \quad (1)$$

wherein $\lambda$ is the wavelength that is taken the same in x- and y-direction, i.e. it is the period in which the pattern repeats, in units of x and y. The intensity I(x,y) may be scaled between 0 and 1, but it can be multiplied by any factor. As an example, I(x,y) can be multiplied by 255, and every value can be rounded to the nearest integer value, in order to represent an 8-bit binary intensity.

Figure 3:
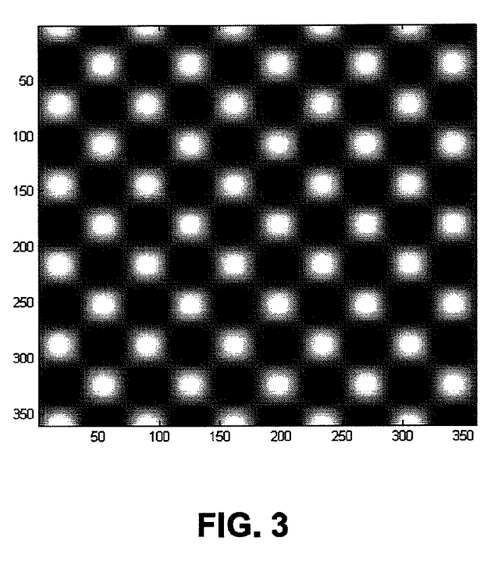
FIG. 3 depicts an embodiment of a two-dimensional illumination pattern to be used in an embodiment of a method and apparatus according to the present invention.
Figure 4A:
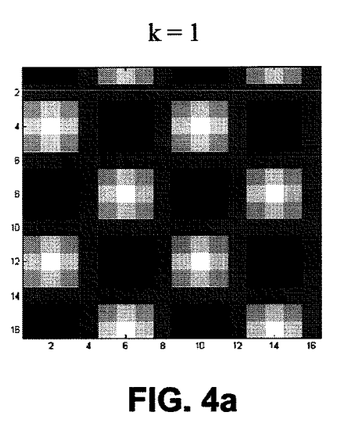
FIGS. 4a-4h depict a sequence of intensity distributions of a two-dimensional illumination pattern to be used in an embodiment of a method and apparatus according to the present invention.
Figure 4B:
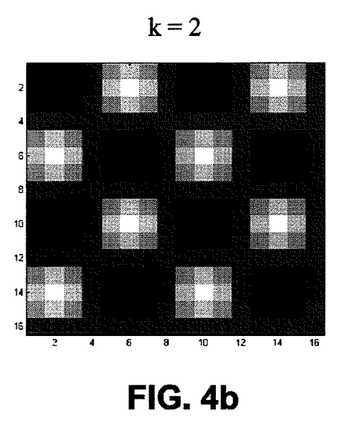
Figure 4C:
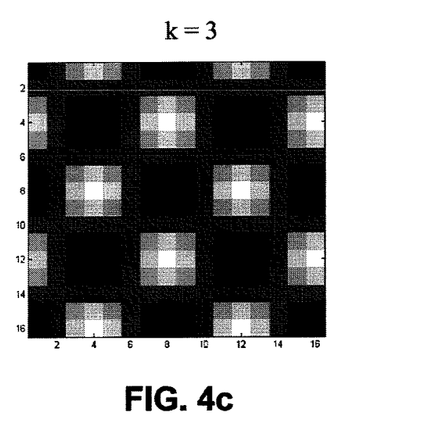
Figure 4D:
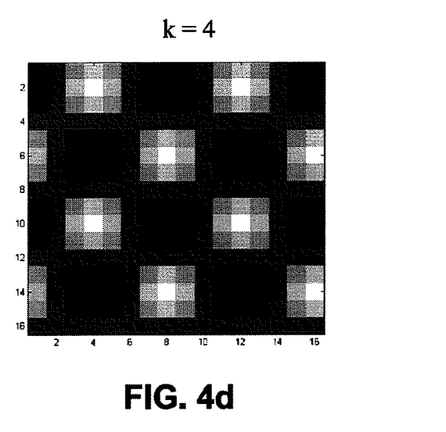
Figure 4E:
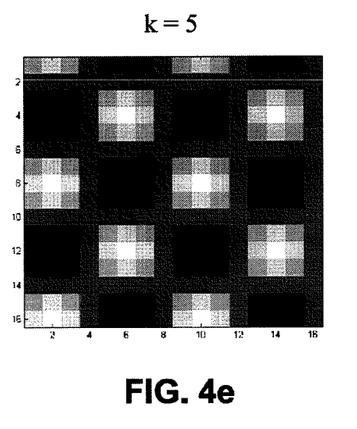
Figure 4F:
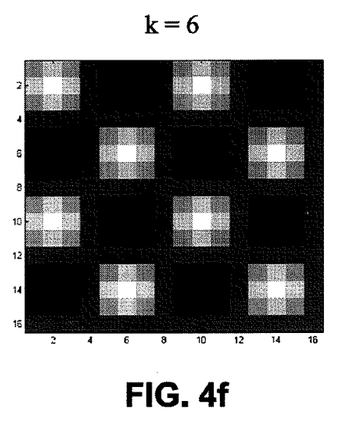
Figure 4G:
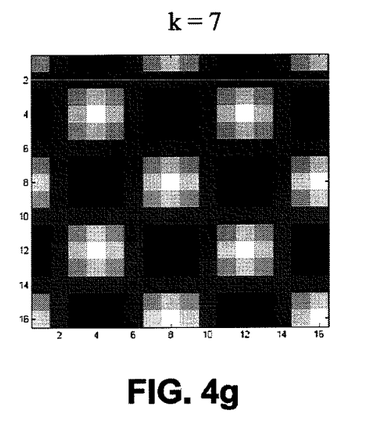
Figure 4H:
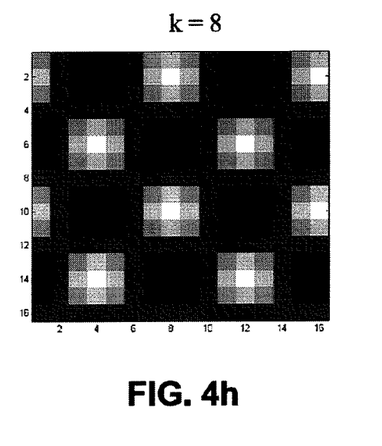
Figure 5A:
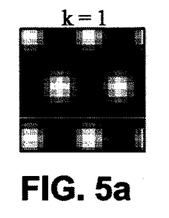
FIGS. 5a-5h depict another sequence of intensity distributions of a two-dimensional illumination pattern to be used in an embodiment of a method and apparatus according to the present invention.
Figure 5B:
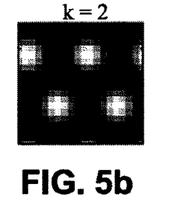
Figure 5C:
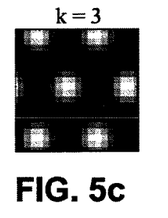
Figure 5D:
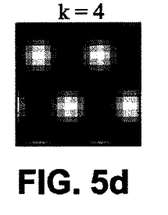
Figure 5E:
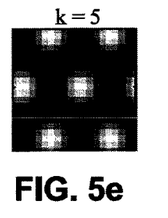
Figure 5F:
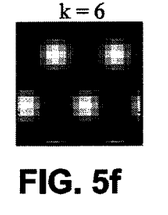
Figure 5G:
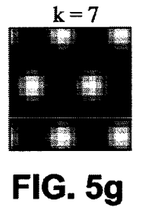
Figure 5H:
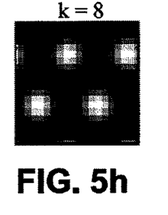

The pattern according to equation (1) can be regarded as a sinusoidal version of a chessboard pattern. As an example, a pattern with x,y ranging from 1 to 360, and a wavelength $\lambda$ of 72 x,y units is given in FIG. 3.

A periodic sequence of 2n steps (n>2) can be defined according to equation (2):

$$I(x, y) = 0.5 + 0.25 \cdot \sin\left(\frac{(x + i \cdot \lambda/n + y + j \cdot \lambda/4) \cdot 2\pi}{\lambda}\right) + \quad (2)$$

-continued
$$0.25 \cdot \sin\left(\frac{(x + i \cdot \lambda/n - y - j \cdot \lambda/4) \cdot 2\pi}{\lambda}\right)$$

wherein:
i=1, 1, 2, 2, . . . , n, n
j=0, 1, 0, 1, 0 . . . .

In a sequence of k projected images on the image detector 11 for n=4, and for projection number k=2i+j−1, the following values of i and j are taken in accordance with the above, as shown in Table 1:

TABLE 1

| k | 1 | 2 | 3 | 4 | 5 | 6 | 7 | 8 | ... |
|---|---|---|---|---|---|---|---|---|-----|
| i | 1 | 1 | 2 | 2 | 3 | 3 | 4 | 4 | ... |
| j | 0 | 1 | 0 | 1 | 0 | 1 | 0 | 1 | ... |

As an example, FIGS. 4a-4h show an intensity distribution for a sequence of 8 steps (n=4) and a wavelength $\lambda$ of 8 pixels on a 16×16 grid. For FIGS. 4a-4h, k=1-8, respectively, for 8 different scanning positions. Further scanning positions may be taken, in which the sequence of the spatial patterns for k=1-8 as shown in FIGS. 4a-4h is repeated.

In this example, the sequence k=1-3-5-7 (FIGS. 4a, 4c, 4e, 4g, respectively) represents a phase shift in the X direction in steps of $\pi$/2. The sequence k=2-4-6-8 (FIGS. 4b, 4d, 4f, 4h, respectively) also represent a phase shift in the X direction in steps of $\pi$/2. For the Y positions (y=2, 6, 10, 14) where the sequence k=1-3-5-7 provides a minimum contrast, the sequence k=2-4-6-8 maximizes the contrast, whereas for the Y positions (y=4, 8, 12, 16) where the sequence k=1-3-5-7 provides a maximum contrast, the sequence k=2-4-6-8 minimizes the contrast.

In addition, the sequence k=1-2-5-6 represents a phase-shift in the Y direction in steps of $\pi$/2. The sequence k=3-4-7-8 provides maximum contrast for the X positions (x=4, 8, 12, 16) where the contrast of the sequence k=1-2-5-6 provides a minimum contrast, whereas the sequence k=3-4-7-8 provides minimum contrast for the X positions (x=2, 6, 10, 14) where the contrast of the sequence k=1-2-5-6 provides a maximum contrast.

It can be advantageous to increase the number of symmetry axes further. This can be done by adding three sine patterns, that are oriented under 120°. According to the second example, the spatial pattern comprises three sine patterns that are projected at 120° relative to each other.

A periodic sequence of 2n steps (n>2) can then be defined according to equation (2a):

$$I(x, y) = 0.5 + \frac{1}{6}\left[\begin{array}{l} \sin\left(\frac{2\pi \cdot (y - j \cdot \lambda/2)}{\lambda}\right) + \\ \sin\left(\frac{2\pi \cdot (y - j \cdot \lambda/2 + \sqrt{3} x)}{2\lambda} - \frac{\pi}{4} - (i-1) \cdot \frac{2\pi}{n}\right) + \\ \sin\left(\frac{2\pi \cdot (y - j \cdot \lambda/2 - \sqrt{3} x)}{2\lambda} + \frac{\pi}{4} + (i-0) \cdot \frac{2\pi}{n}\right) \end{array}\right] \quad (2a)$$

wherein:
i=1, 1, 2, 2, . . . , n, n
j=0, 1, 0, 1, 0 . . . .

As the patterns will be projected, the intensity values given by equation (2a) can be normalized, e.g. between 0 and 1 or on an 8-bit scale between 0 and 255.

In a sequence of k projected images on the image detector 11 for n=4, and for projection number k=2i+j−1, the following values of i and j are taken in accordance with the above, as shown in Table 2:

TABLE 2

| k | 1 | 2 | 3 | 4 | 5 | 6 | 7 | 8 | ... |
|---|---|---|---|---|---|---|---|---|-----|
| i | 1 | 1 | 2 | 2 | 3 | 3 | 4 | 4 | ... |
| j | 0 | 1 | 0 | 1 | 0 | 1 | 0 | 1 | ... |

As an example, FIGS. 5a-5h show an intensity distribution for a sequence of 8 steps (n=4) and a wavelength λ of 8 pixels. For FIGS. 5a-5h, k=1-8, respectively, for 8 different scanning positions. Further scanning positions may be taken, in which the sequence of the spatial patterns for k=1-8 as shown in FIGS. 5a-5h is repeated.

In an evaluation of a recorded intensity of the image, its relationship to intensities with the same shift perpendicular to the other spatial direction is considered. This means that for every image with an even k number, it is related to images with even k numbers only. The same applies for images with odd k numbers.

For these sub-sets of signals, any method described in EP 2327956 A1 can be used, which is incorporated by reference herein.

These two sub-sets are combined so that an envelope curve function value for every (x",y") coordinate in the image plane, as a function of image number k is obtained.

As an example, an envelope function $E_c$ can be defined analogous to K. G. Larkin, *Efficient nonlinear algorithm for envelope detection in white light interferometry*, J. Opt. Soc. Am. A., V 13, No. 4, April 1996, pp 832-843 (herein "Larkin"), according to equation (3):

$$E_c(x",y",z_k) = (I(x",y",z_{k+2}) - I(x",y",z_{k-2}))^2 + (I(x",y",z_k) - I(x",y",z_{k-4})) \cdot (I(x",y",z_k) - I(x",y",z_{k+4})) \quad (3)$$

Another example uses a 7-step interferogram algorithm, described in P. Sandoz, *An Algorithm for Profilometry by white-light phase-shifting interferometry*, J. Mod. Opt. 43, 1996, 1545-1554 (herein "Sandoz") according to equation (4):

$$E_c(x",y",z_k) = (3 \cdot I(x",y",z_{k-2}) - 3 \cdot I(x",y",z_{k+2}) + I(x",y",z_{k+6}) - I(x",y",z_{k-6}))^2 \ldots + (4 \cdot I(x",y",z_{k-4}) - 2 \cdot I(x",y",z_{k+4}))^2 \quad (4)$$

Here, k is the projection number and $z_k$ is the corresponding Z coordinate of the specimen 8.

Figure 6A:
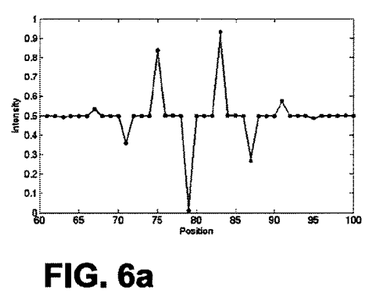
FIGS. 6a and 6b depict measured intensity signals produced by an optical detector for a single pixel thereof.
Figure 6B:
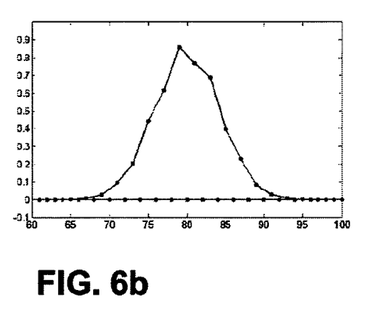
Figure 6C:
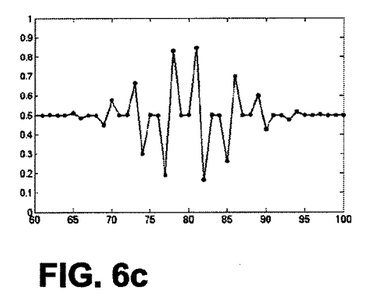
FIGS. 6c and 6d depict envelope functions/envelope curves calculated from the measured intensity signals according to FIGS. 6a and 6b, respectively.
Figure 6D:
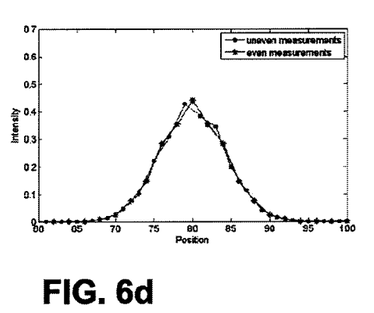

In FIG. 6a, the 'signals' (intensity data) are given for a single pixel for the case that the contrast is maximum for the measurements for the odd k projections, and the contrast is minimum for the measurements for the even k projections. FIG. 6c provides the signals intensity data for the case the contrast is intermediate for the measurements for both the odd and even k projections. FIGS. 6b, 6d provide the respective envelope functions as calculated by equation (3).

Finally, the scanning position relating to the maximum of the envelope function is determined. This position represents the height of the surface 9.

One possibility of determining the maximum is by calculating the center of gravity. This takes the weighed average of the determination of the measurements for both the uneven and even k projections into account. The center of gravity z(x,y) is given by equation (5):

$$z(x', y') = \frac{\sum_{k=k_m-r}^{k=k_m+r} z_k \cdot E_c(x", y", z_k)}{\sum_{k=k_m-r}^{k=k_m+r} E_c(x", y", z_k)} \quad (5)$$

Here, $k_m$ is a position index corresponding to the maximum of $E_c$ and r is the range where the envelope function is significantly larger than the background noise.

If a peak-fitting function is used to determine z(x,y), first the value of $E_c$ can be smoothened by combining the measurements for the even and uneven k projections, according to equation (6):

$$E_{c,s}(x",y",z_k) = (2 \cdot E_c(x",y",z_k) + E_c(x",y",z_{k+1}) + E_c(x",y",z_{k-1}))/4 \quad (6)$$

This can be approximated according to equation (7):

$$E_c(x",y",z_k) = (I(x",y",z_{k-2}) - I(x",y",z_{k+2}))^2 + (I(x",y",z_{k+1}) - 0.75 \cdot I(x",y",z_{k-3}) - 0.25 \cdot (I(x",y",z_{k+5}))^2 \ldots + (I(x",y",z_{k-1}) - 0.75 \cdot I(x",y",z_{k+3}) - 0.25 \cdot I(x",y",z_{k-5}))^2 \ldots + (I(x",y",z_k) - 0.5 \cdot I(x",y",z_{k+4}) - 0.5 \cdot I(x",y",z_{k-4}))^2 \quad (7)$$

The resulting Z figures for each spatial position are combined to form a height map of the surface 9.

In a phase-sensitive modification, the sensitivity of the method can be enhanced by multiplying the captured intensities by a weighing factor W(x",y") given by equation (8) for every Z step (scanning step), where the X and Y coordinates and the wavelength refer to the image plane and correspond to the X,Y coordinates of the projected intensities. The weighing factor in the image plane is defined according to equation (8):

$$W(x", y", k) = \left( \begin{array}{c} 0.5 \cdot \sin\left(\frac{(x" + i \cdot \lambda"/n + y" + j \cdot \lambda"/4) \cdot 2\pi}{\lambda"}\right) + \\ 0.5 \cdot \sin\left(\frac{(x" + i \cdot \lambda"/n - y" - j \cdot \lambda"/4) \cdot 2\pi}{\lambda"}\right) \end{array} \right) \quad (8)$$

Here, λ" is the effective wavelength of the spatial pattern on the image detector 11.

Now, the phase-sensitive amplitude function $A_{ps}$ can be defined according to equation (9):

$$A_{ps}(x", y", z_{k0}) = \sum_{k=k_0-n}^{k=k_0+n} I(x", y", z_k) \cdot W(x", y", k) \quad (9)$$

wherein:
i=1, 1, 2, 2, ..., n, n
j=0, 1, 0, 1, ...
k=2i+j−1.

From this function $A_{ps}$, the maximum value can be taken as an approximation of the Z coordinate, or it can be taken as a first approximation, after which the function $E_{PS} = (A_{ps})^2$ is calculated that is further treated as the envelope function, e.g. by applying equation (5).

This method reduces the influence of neighboring points on the specimen 8 to be measured, that have a different reflectance and will affect the measurement where the (x',y') point on the surface 9 of the specimen 8 is out of focus. This method reduces the effect of neighboring points with a different phase.

Another way of phrasing the phase-sensitive method is that any intensity difference $(I(x'',y'',z_k)-I(x'',y'',z_{k+4}))$ should be weighed with the maximum modulation it can have when the specimen 8 is in focus. This is equivalent to putting a weight to any term containing $I(x'',y'',z_k)-I(x'',y'',z_{k+4})$.

The correspondence between (x,y,k) on the grid and $(x'',y'',z_k)$ at the detector can be established by a separate calibration; e.g. by measuring an optical flat and measuring the phase near the maximum modulation depth. For n=4, the phase can be defined as in equation (10):

$$\varphi(x'', y'', z_k) = \arctan \frac{(I(x'', y'', z_{k+2}) - (I(x'', y'', z_{k-2}))}{\begin{pmatrix} I(x'', y'', z_k) - I(x'', y'', z_{k-4}) \cdot \\ (I(x'', y'', z_{k+4}) - I(x'', y'', z_k)) \end{pmatrix}} \quad (10)$$

From this the phase at k=0 and k=1 can be determined from the even and odd measurements respectively. For the phase as a function of the specimen height the equations (11):

$$\varphi(x'', y'', z_k)_e = \varphi_0(x'', y'', z_{k=0})_e + k\frac{\pi}{4} \quad (11)$$

and $$\varphi(x'', y'', z_k)_o = \varphi_0(x'', y'', z_{k=\perp})_o + k\frac{\pi}{4}$$

hold for even and uneven values of k, respectively.

Once $\phi_0(x'',y'')$ is determined for even and odd measurements, $\cos(\phi(x'',y'',z_k))$ can be used as a weighing function $W(x'',y'',k)$ in subsequent measurements of other surfaces. This weighing function can be smoothened by 2D filtering in the Fourier domain.

The method can also be combined with a contrast detection method such as described in M. Noguchi and S. K. Nayar, *Microscopic Shape from Focus Using Active Illumination*, Proc. Int. Conf. Pattern recognition (ICPR), Jerusalem, October 1994 (herein "Noguchi"), known as Shape-From-Focus (SFF). As an example, instead of an intensity $I(x'',y'',z_k)$, a contrast amplitude $A_{sff}$ can be defined according to equation (12):

$$A_{SFF}(x'',y'',z_k) = (2 \cdot I(x'',y'',z_k) - I(x''+\lambda''/2,y'',z_k) - I(x''-\lambda''/2,y'',z_k)) + (2 \cdot I(x'',y'',z_k) - I(x'',y''+\lambda''/2,z_k) - I(x'',y''-\lambda/2,z_k)) \quad (12)$$

This is analogous to the Laplacian operator that is defined as equation (16) in Noguchi. In equation (3) of U.S. Patent Pub. No. 2010/0321773 A1, the absolute value is taken; according to the present disclosure, taking the absolute value would take away the advantage of the phase-shift and contrast method, as $A_{SFF}(x'',y'',z_k) = -A_{SFF}(x'',y'',z_{k+4})$; this is used when applying equations (3) and (5).

The difference with taking the intensities $I(x'',y'',z_k)$ in equation (3) is that here the modulation in the image itself in the X-Y plane—illuminated with the pattern—is considered as a function of Z. This may give a better signal for small dark spots in a bright environment, where applying the intensities $I(x'',y'',z_k)$ in equation (3) may give a small and noisy signal.

The contrast-function according to equation (12) may be used with the pattern as defined in equation (1) that is shifted as in equation (2) and evaluated with either envelope detection method, equations (3)-(6).

For points as bright as their environment, application of equation (3) to the intensities may give a higher Z accuracy and a higher (x,y) resolution as the signal in its maximum does not depend on the intensity and height of its neighboring points. Also at local peaks or in high slope areas, application of equation (10) may give a worse signal than directly taking the intensities in equation (3).

Instead of taking the contrast with points $\lambda/2$ separated, the contrast can as well be taken with points $\lambda/2+n\cdot\lambda$ apart. Based on the relative signal strength of $E_c$ and $A_{SFF}$ the Z value derived from either, or a weighed combination, can be taken as the final value.

Also for this contrast calculation, the intensity modulation can be weighed, so no modulation can be measured where it could not occur.

It is noted that the patterns as in FIGS. 4a-4h and 5a-5h can be obtained by projecting single-dimensional sine patterns in succession within one exposure time of the image detector 11. For example, equation (2) can be re-written according to equation (13):

$$I(x, y, k = 2i + j - 1) = A + B \quad (13)$$

$$\text{With } A = 0.25 + 0.25 \cdot \sin\left(\frac{(x + i \cdot \lambda/n + y + j \cdot \lambda/4) \cdot 2\pi}{\lambda}\right)$$

and $$B = 0.25 + 0.25 \cdot \sin\left(\frac{(x + i \cdot \lambda/n - y - j \cdot \lambda/4) \cdot 2\pi}{\lambda}\right)$$

Figure 7:
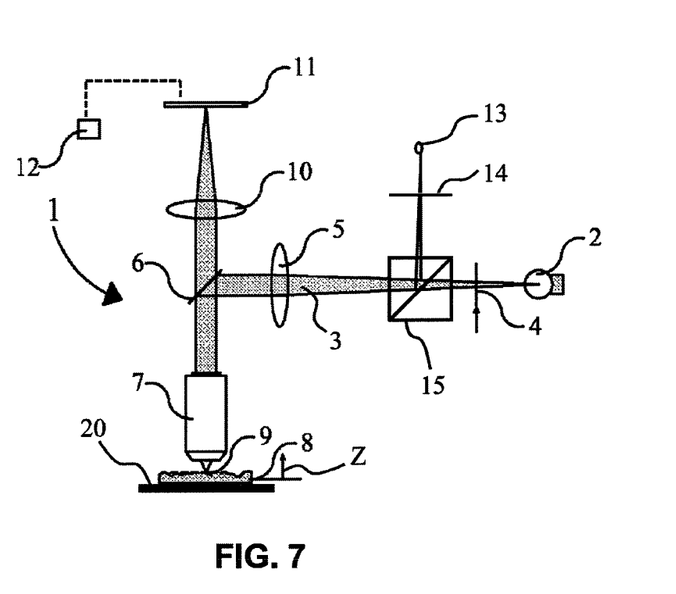
FIG. 7 schematically depicts a further embodiment of an apparatus according to the present invention.

Now in equation (13), A and B describe single-dimensional sine patterns. If these are projected in succession within one exposure time of the image detector 11, while the specimen 8 is moving in the Z direction, effectively the same patterns are captured by the image detector 11. As effective Z coordinate, the average Z position of the two captured images must be taken as value attributed to the effective multi-dimensional sine pattern. The same effect can be achieved by combining two sine spatial patterns 4, 14 with different orientation directions as illustrated in FIG. 7. In this case the spatial patterns can consist of hardware gratings illuminated by light sources 2, 13, respectively, that can easier be produced and moved in a single direction, compared to an LCD display or similar 2D projection device.

As explained above, a method and apparatus for determining the height of a plurality of spatial positions on a surface of a specimen, a light beam is projected on the surface. The light beam has a sinusoidal spatial pattern in at least two directions perpendicular to an optical axis of the light beam, and which is moved to different spatial pattern positions. The surface is scanned along the optical axis in different scanning positions. A fixed relationship between a moving distance between subsequent spatial pattern positions, and a scanning distance between subsequent scanning positions exists. The light reflected by the surface is detected in scanning positions with the spatial pattern having corresponding spatial pattern positions. From the detected light for each spatial position of the surface, an envelope curve of intensity values corresponding to scanning positions is determined. A maximum of the envelope curve and its corresponding scanning position being representative of the height of the spatial position of the surface is selected. The spatial pattern is moved in a sequence of 2n steps (n>2) in a first and a second spatial direction over a distance of ¼ and 1/n pattern wavelength, respectively.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a"/"an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

A single processor or other unit may fulfil the functions of several items recited in the claims.

The term computer program is defined as a sequence of instructions designed for execution by a one or more processors on one or more computer systems. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

A computer program may be stored and/or distributed on a suitable medium, such as an optical storage medium or a solid-state medium supplied together with or as part of other hardware, but also be distributed and/or run in other forms, such as via the Internet or other wired or wireless telecommunication systems.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A method for determining the height of a plurality of spatial positions on a surface of a specimen, the method comprising:

projecting a light beam on the surface of the specimen, the light beam having a spatial pattern which is periodic in at least two directions perpendicular to an optical axis of the light beam;

moving the spatial pattern to different spatial pattern positions;

scanning the surface along the optical axis in different scanning positions, wherein there is a fixed relationship between a moving distance between subsequent spatial pattern positions, and a scanning distance between subsequent scanning positions;

detecting the light reflected by the surface in scanning positions with the spatial pattern having corresponding spatial pattern positions;

determining, from the detected light for each spatial position of the surface, an envelope curve of intensity values corresponding to scanning positions; and selecting a maximum of the envelope curve and its corresponding scanning position being representative of the height of the spatial position of the surface, wherein the spatial pattern is a sinusoidal pattern having a pattern wavelength in the at least two directions, the spatial pattern being moved in a sequence of 2n steps (n>2), the spatial pattern being moved by n times repeating the following steps (a)-(c) involving a starting spatial pattern position, and a next spatial pattern position:

(a) moving the spatial pattern relative to the starting spatial pattern position in a first spatial direction over a first moving distance of ¼ pattern wavelength;

(b) moving the spatial pattern relative to the starting spatial pattern position in a second spatial direction over a second moving distance of 1/n pattern wavelength to the next spatial pattern position; and (c) making this next position the starting spatial pattern position.

2. The method according to claim 1, wherein the pattern wavelength in each of the at least two directions is equal.

3. The method according to claim 1, wherein the spatial pattern includes two orthogonal sinusoidal patterns, and wherein for k scanning positions the intensity I(x,y) of a point (x,y) of the spatial pattern is defined as:

$$I(x, y) = 0.5 + 0.25 \cdot \sin\left(\frac{(x + i \cdot \lambda/n + y + j \cdot \lambda/4) \cdot 2\pi}{\lambda}\right) + 0.25 \cdot \sin\left(\frac{(x + i \cdot \lambda/n - y - j \cdot \lambda/4) \cdot 2\pi}{\lambda}\right)$$

wherein:
i=1, 1, 2, 2, . . . , n, n
j=0, 1, 0, 1, . . .
k=2i+j−1.

4. The method according to claim 1, wherein the spatial pattern includes three sinusoidal patterns oriented at 120° to each other, and wherein for k scanning positions, the intensity I(x,y) of a point (x,y) of the spatial pattern is defined as:

$$I(x, y) = 0.5 + \frac{1}{6}\left[\begin{array}{l}\sin\left(\frac{2\pi \cdot (y - j \cdot \lambda/2)}{\lambda}\right) + \\ \sin\left(\frac{2\pi \cdot (y - j \cdot \lambda/2 + \sqrt{3}\,x)}{2\lambda} - \frac{\pi}{4} - (i-1) \cdot \frac{2\pi}{n}\right) + \\ \sin\left(\frac{2\pi \cdot (y - j \cdot \lambda/2 - \sqrt{3}\,x)}{2\lambda} + \frac{\pi}{4} + (i-0) \cdot \frac{2\pi}{n}\right)\end{array}\right]$$

wherein:
i=1, 1, 2, 2, . . . , n, n
j=0, 1, 0, 1, . . .
k=2i+j−1.

5. The method according to claim 1, wherein a time period of moving between two subsequent spatial pattern positions and two subsequent scanning positions is equal.

6. The method according to claim 1, wherein the scanning movement is a continuous movement, in particular an even movement.

7. The method according to claim 1, wherein the selecting a maximum of the envelope curve comprises calculating a center of gravity of the envelope.

8. The method according to claim 1, wherein the light beam is a strobing light beam of which the light pulses are synchronized with the phase of the moving spatial pattern.

9. The method according to claim 1, wherein each intensity value as determined from the detected light for each spatial position of the surface is multiplied by a weighing factor based on the light intensity of the corresponding spatial position on the spatial pattern, emitted when the light intensity is detected.

10. The method according to claim 1, comprising:
calculating a local contrast based on a difference of intensity values at spatial positions separated by half the wavelength, or by half the wavelength plus a multiple of wavelengths; and
determining, from the local contrast value, for each spatial position and scanning position, an envelope curve.

11. An apparatus for determining the height of a plurality of spatial positions on a surface of a specimen, the apparatus comprising:
a light beam projector configured to project a light beam on the surface of the specimen, the light beam having a spatial pattern which is periodic in at least two directions perpendicular to an optical axis of the light beam, and which moves to different spatial pattern positions;
a scanner configured to scan the surface along the optical axis in different scanning positions, wherein there is a fixed relationship between a moving distance between subsequent spatial pattern positions, and a scanning distance between subsequent scanning positions;
a light detector configured to detect the light reflected by the surface in scanning positions with the spatial pattern having corresponding spatial pattern positions; and
a processor configured to:
determine, from the light detected by the light detector for each spatial position of the surface, an envelope curve of intensity values corresponding to scanning positions
select a maximum of the envelope curve and its corresponding scanning position, and
calculate the height of the spatial position of the surface,
wherein the spatial pattern is a sinusoidal pattern having a pattern wavelength in the at least two directions, the spatial pattern being movable in a sequence of 2n steps (n>2), the spatial pattern being moved by n times repeating the following steps (a)-(c) involving a starting spatial pattern position, and a next spatial pattern position:
(a) moving the spatial pattern relative to the starting spatial pattern position in a first spatial direction over a first moving distance of ¼ pattern wavelength;
(b) moving the spatial pattern relative to the starting spatial pattern position in a second spatial direction over a second moving distance of 1/n pattern wavelength to the next spatial pattern position; and
(c) making this next spatial pattern position the starting spatial pattern position.

12. At least one tangible, one non-transitory computer-readable medium storing an executable set of instructions for determining the height of a plurality of spatial positions on a surface of a specimen which, when executed by a processor, causes the processor to execute operations comprising:
projecting a light beam on the surface of the specimen, the light beam having a spatial pattern which is periodic in at least two directions perpendicular to an optical axis of the light beam;
moving the spatial pattern to different spatial pattern positions;
scanning the surface along the optical axis in different scanning positions, wherein there is a fixed relationship between a moving distance between subsequent spatial pattern positions, and a scanning distance between subsequent scanning positions;
detecting the light reflected by the surface in scanning positions with the spatial pattern having corresponding spatial pattern positions;
determining, from the detected light for each spatial position of the surface, an envelope curve of intensity values corresponding to scanning positions; and
selecting a maximum of the envelope curve and its corresponding scanning position being representative of the height of the spatial position of the surface,
wherein the spatial pattern is a sinusoidal pattern having a pattern wavelength in the at least two directions, the spatial pattern being moved in a sequence of 2n steps (n>2), the spatial pattern being moved by n times repeating the following steps (a)-(c) involving a starting spatial pattern position, and a next spatial pattern position:
(a) moving the spatial pattern relative to the starting spatial pattern position in a first spatial direction over a first moving distance of ¼ pattern wavelength;
(b) moving the spatial pattern relative to the starting spatial pattern position in a second spatial direction over a second moving distance of 1/n pattern wavelength to the next spatial pattern position; and
(c) making this next position the starting spatial pattern position.

* * * * *